E. M. BAYNE.
JOINT FOR STOVEPIPES AND THE LIKE.
APPLICATION FILED AUG. 11, 1919.

1,365,884.

Patented Jan. 18, 1921.

Inventor
Emmor M. Bayne
By W. W. Williamson
Atty.

UNITED STATES PATENT OFFICE.

EMMOR M. BAYNE, OF PHILADELPHIA, PENNSYLVANIA.

JOINT FOR STOVEPIPES AND THE LIKE.

1,365,884.  Specification of Letters Patent. Patented Jan. 18, 1921.

Application filed August 11, 1919. Serial No. 316,750.

*To all whom it may concern:*

Be it known that I, EMMOR M. BAYNE, a citizen of the United States, residing at Philadelphia, in the county of Philadelphia and State of Pennsylvania, have invented new and useful Improvements in Joints for Stovepipes and the like, of which the following is a specification.

My invention relates to a new and useful improvement in joints for stove pipes and the like, and has for its object to provide a simple and effective method for coupling stove pipe lengths together and locking them against accidental displacement.

With this end in view, this invention consists in the details of construction and combination of elements, hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Figure 1:
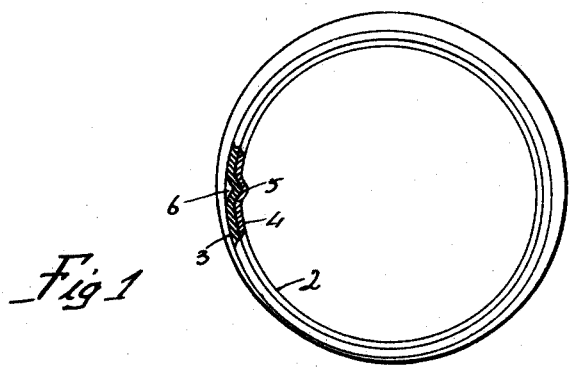
Figure 1, is an end view of a stove pipe joint a portion being broken away and sectioned to clearly show the locking means.
Figure 2:
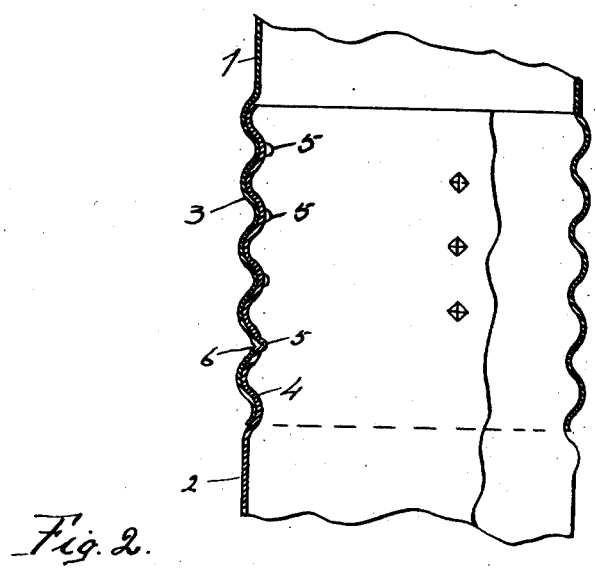
Fig. 2, is a sectional elevation of the joint the female threads being entirely in section while the male threads are in section upon one end and in elevation upon the other side.

In carrying out my invention as here embodied, 1 and 2 represent the ends of two stove pipe lengths, the end 1 having female screw threads 3 formed thereon while 2 has corresponding male threads 4 formed thereon. These screw threads are so pressed or formed in the metal as to give long easy curves in order that the ends may readily screw together making a closed joint.

The length of the pipe 2 has a series of indentations 5 formed therein which indentations are preferably of pyramidal shape while the pipe length 1 is provided with a projection or teat 6 adapted to fit into the indentations 5 so as to lock the ends of the pipes together when the joint has been made, and since there are a series of indentations 5 it follows that the pipes may be locked at different points thereby providing for a certain amount of adjustment of the joint.

When the ends of the pipe are screwed together the projection 6 will ride over the male threads, the pipes springing sufficiently for that purpose, but when this projection registers with one of the indentations 5 it will spring therein and hold the joint against accidental displacement, but may be readily unlocked by exerting sufficient twisting force to cause the projection to ride out of the indentations.

By having a series of indentations the joint is made adjustable and this is of great advantage in running a line of stove or other pipe since the lengths of pipe do not have to be cut to fill in a given distance as each length may be extended so as to accomplish the exact distance desired. My invention is especially applicable to elbow and other angle pipes since it permits the amount of adjustment necessary to bring such angle pipes into proper alinement.

It is to be understood that in stove pipe lengths a male thread is formed upon one end of each length and a female thread is formed upon the opposite end in order that these lengths may be interchangeable and reversible.

Of course I do not wish to be limited to the exact details of construction as herein shown as these may be varied within the limits of the appended claims without departing from the spirit of my invention.

Having thus fully described my invention, what I claim as new and useful is:—

1. A pipe joint consisting of female threads formed upon the end of a pipe, male threads formed upon the end of another pipe, said threads being adapted to screw together, indentations formed upon the male threads, and a projection formed upon the female thread, said projection adapted to engage either of the indentations for locking the joint together.

2. As a new article of manufacture a sheet metal pipe having female threads formed upon one end, and male threads formed upon the opposite end, indentations formed in the male threads, and a projection formed in the female thread.

3. A pipe joint comprising two coacting pipes having their meeting ends threaded so as to be screwed together, the coöperating threads of one pipe having indentations formed therein and the projections produced in one section of the coöperating threads of the other pipe as shown and described.

4. A stove pipe joint comprising a male threaded pipe end having a series of indentations arranged in spiral formation corresponding to the pitch of the threads, and a female threaded pipe end having an inward projection adapted to register with said indentations as the two ends are screwed together whereby said ends may be held in various adjustments against accidental displacement.

In testimony whereof, I have hereunto affixed my signature.

EMMOR M. BAYNE.